(Model.) W. & W. A. THOMPSON.
VISE.

No. 557,452.　　　　　　Patented Mar. 31, 1896.

3 Sheets—Sheet 1.

Witnesses
E. Tuttle
Carrie E. Nichols

Inventors
William Thompson
William A. Thompson
Per Edwin W. Brown
Attorney (Model.)

W. & W. A. THOMPSON.
VISE.

No. 557,452.

3 Sheets—Sheet 2.

Patented Mar. 31, 1896.

WITNESSES

INVENTORS:
William Thompson
William A. Thompson
Per Edwin W. Brown
Attorney (Model.)

W. & W. A. THOMPSON.
VISE.

No. 557,452.

3 Sheets—Sheet 3.

Patented Mar. 31, 1896.

WITNESSES
E. Tuttle
Carrie E. Nichols

INVENTORS
William Thompson
William A. Thompson
Per Edwin W. Brown
Attorney

UNITED STATES PATENT OFFICE.

WILLIAM THOMPSON AND WILLIAM A. THOMPSON, OF BROCKTON, MASSACHUSETTS.

VISE.

SPECIFICATION forming part of Letters Patent No. 557,452, dated March 31, 1896.

Application filed February 10, 1892. Serial No. 421,023. (Model.)

*To all whom it may concern:*

Be it known that we, WILLIAM THOMPSON and WILLIAM A. THOMPSON, of Brockton, in the county of Plymouth and State of Massachusetts, have invented certain new and useful Improvements in Vises or Clamps, of which the following is a full, clear, and exact description.

This invention consists of a clamp or vise consisting of two jaws suitably connected together for operation, whereby after the jaws are set substantially to the work or article to be held between them they can be easily closed tightly upon the same and as easily opened, leaving the article free to be removed therefrom, so that in the use of the vise a large number of articles of the same size, such as boot or shoe lasts, can easily, conveniently, and quickly be placed in the jaws and held firmly for operation thereon and as easily and quickly released therefrom, one after the other, with but a slight movement of the jaws and without disturbing or altering the general set of the jaws to their work, all substantially as hereinafter fully described, reference being had to the accompanying sheets of drawings, in which—

Figure 1:
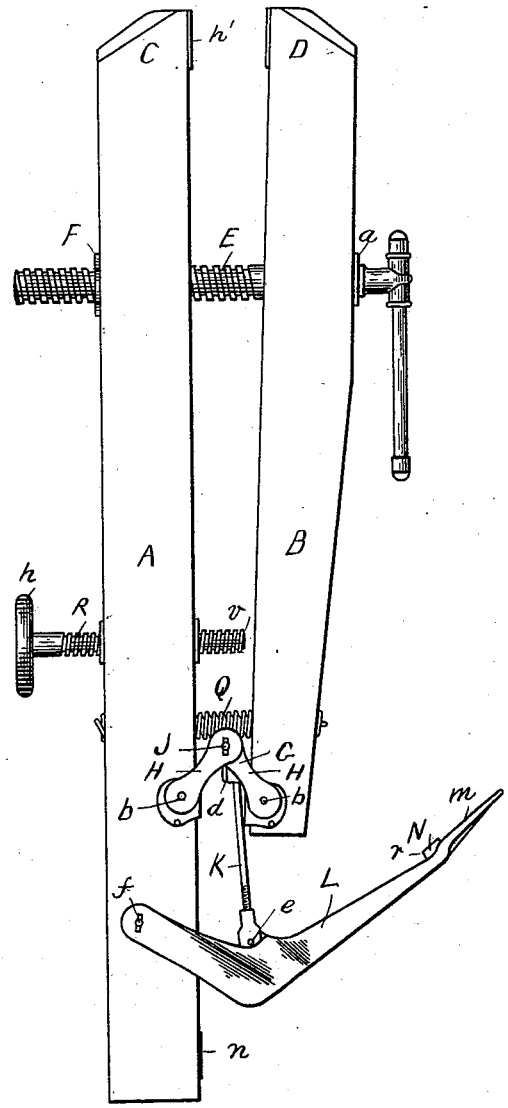
Figures 2, 3:
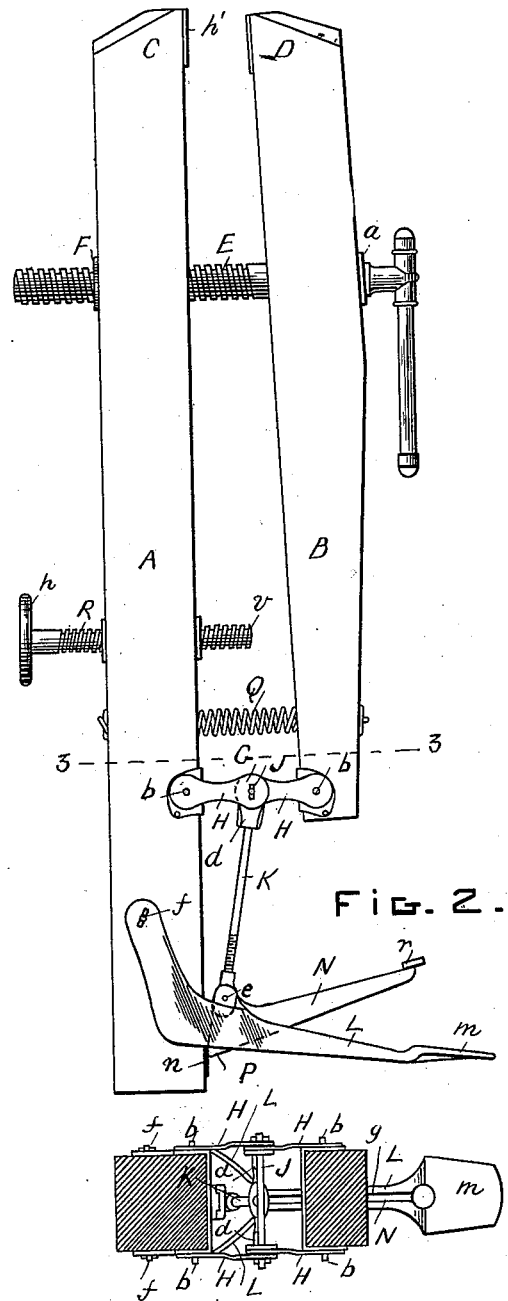
Figure 4:
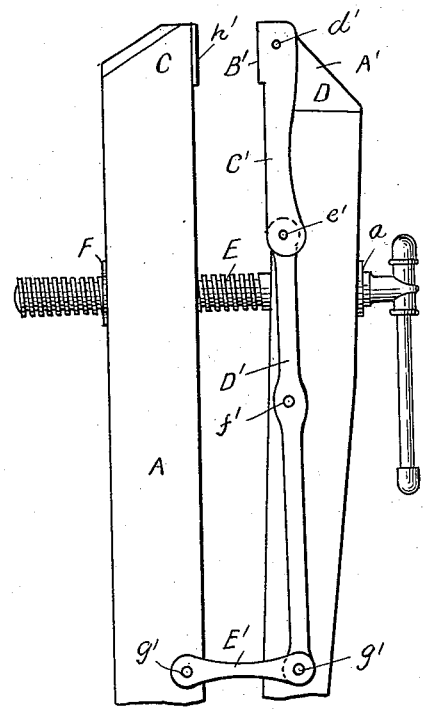
Figure 5:
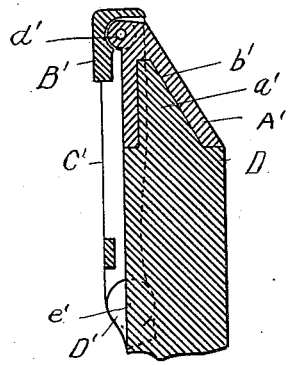

Figure 1 is a side view of a clamp or vise as set in position to receive the work to be operated upon. Fig. 2 is a similar side view, but with the jaws as moved to tightly clamp between them the work to be operated upon. Fig. 3 is a cross-section on line 3 3, Fig. 2. Fig. 4 is a detail side view like Fig. 1, showing other parts in connection therewith; and Fig. 5 is a detail vertical section of Fig. 4.

In the drawings, A B represent two upright bars, their upper ends C D constituting more particularly the two clamps or jaws of the vise, between which the article is held.

E is a screw which extends freely through the bar or jaw B and screws into a nut F, secured in the other bar or jaw, the screw being arranged in any of the usual ways at $a$ for its turning freely in its socket in the bar B, but prevented from longitudinal movement therein.

Pivoted to the lower end of each jaw-bar is a toggle-joint lever G, which consists of links H, pivoted at their outer ends at $b$ to each side of the bars and connected at their adjacent ends by a cross-rod or pivot J. (Shown more particularly in Fig. 3.) Pivoted by arms $d$ to this cross-rod J is a bar or rod K, which extends downward and at its lower end is pivotally connected to a cross-rod or pivot $e$ of an angular-shaped lever or treadle L, pivoted at $f$ by its forked arms to each side of the bar or jaw A, as shown in Fig. 3.

Freely disposed in a longitudinal vertical opening $g$ in the treadle-lever L and pivoted to its cross-rod or pivot $e$ is another lever N, having a backward-extending arm or portion P, as shown in Fig. 2, partly in dotted lines.

Q is a spiral spring extending freely through a socket in each bar and secured at its ends to the outer side of each bar, the tension of which serves to pull the two lower ends of the jaws toward each other.

R is a screw having a head $h$, which screws through the bar A and against which the other bar is arranged to bear, as will be described.

In the operation of the clamp or vise, the parts are adjusted to their normal position, (shown in Fig. 1,) which position is obtained by screwing in or out the screw E, which moves the jaws C D to or from each other, according to the size or thickness of the article to be placed between them for work thereon—for instance, a boot or shoe last. Placing the last in position between the two jaws it is held by hand, while the operator places his foot upon the end $m$ of treadle P, and pressing it down firmly the toggle-lever G is pulled down at its central pivot and straightened out, which moves the jaw-bars outward at their lower ends into the position shown in Fig. 2, the screw-rod E serving as a pivot or fulcrum upon which the jaw-bars move, and the jaws C D close upon the last, so that the jaws will press upon the last and firmly hold it between them. In these movements the treadle-lever as it is moved down causes the front end $r$ of the lever N to swing up and its arm or extension P to bear and lie against the side of the bar A, as at $n$, Fig. 2. When desirous of removing the last to put in another, the operator places his foot upon the end $r$ of the small lever N and presses it down, and as the end of its arm P bears against the side of the jaw-bar A it acts as a fulcrum in the downward movement of the outer end of the lever N, raising the treadle L and toggle-joint sufficiently for its spiral spring Q to act upon the lower ends of the jaw-bars to pull them together, swinging them on their screw-rod E, opening the jaws C and D from each other, as shown in Fig. 1, sufficiently to release the last. Another last is then put in, secured, operated upon, and released, as before, and so on. The treadle-lever L rises, and thus the toggle-lever at its central connection, when pressing down the lever N from its position of lock, (shown in Fig. 2,) because the lever N and the toggle-lever by its rod K are connected to the lever L by the rod or pivot J, for in moving down the end $r$ of the lever N its fulcrum end P bearing against the side of the bar A moves upward thereon, and in such movement the lever L is moved or swung outward on its pivot $f$ from the bar A, and consequently from the position of the pivot $e$, being at the right of a vertical line with the pivot $f$, and such pivot $e$ traveling in a circle concentric with the pivot $f$ must and does move upward, consequently raising the central joint of the toggle-lever sufficiently above its dead-center or position shown in Fig. 2 to allow the spring Q to act upon the jaw-bars, as described, to loosen the grip of the jaws on the article placed between them for it to be removed easily.

The jaws after once being generally set for their work are always in position to properly receive the same without having to alter any adjustment of the parts, and by the toggle-lever and operating-lever L the jaws can be forced to firmly hold the work between them, as described. In putting in smaller or larger work the screw E is turned in or out correspondingly for such work, when the jaws are operated by the treadle, as before. After the jaws are set and the toggle-lever pulled down the screw R is turned inward so as to have its end $v$ somewhat near to the jaw B, so that when the toggle is released, before it can swing up its full movement, as shown in Fig. 1, the jaw-bar B will abut against the screw and be stopped from further movement, or more than is actually necessary to release the work, thus saving time in operating the same.

In use the jaw-bar A is preferably rigidly fixed in an upright position against or to the bench or other support, the jaw B making all the movements necessary to close upon the other jaw.

The pivot or point of connection $e$ to the treadle-lever of the toggle-lever is at an angle between the pivot and operating end $m$ of the treadle-lever, and preferably below a straight line between the two, as shown in the drawings, by which an increased power is given to the treadle-lever as it is operated, which is quite an advantage in clamping the work between the jaws.

The projecting arm P of the intermediate lever N can be arranged at other points on the lever to abut against parts or a shoulder to throw off the toggle-lever. For instance, it can be arranged on its under side and so as to abut against the floor or any suitable part.

When the jaws to the vise are as shown in Figs. 1 and 2, the inside faces of the jaws are not parallel with each other, being always at an angle more or less to each other, as shown, and in such case in the use of the jaws for some work they would not fit and hold it as firmly as desired, as in some work to get the proper hold thereon they should, when clamping and holding the article between them, have substantially parallel bearings to make a bite upon the work for longer surfaces, and for such the jaws have the attachment shown in Figs. 4 and 5. In these views the end $a'$ of the bar B fits into a socket $b'$ in an iron piece A', which makes the upper end of the jaw, being secured to the bar by screws or in any suitable manner. Pivoted at $d'$ to this head A' is a plate B', which extends across the inner face of the head and has two side arms C', which extend down, one each side of the jaw-bar, and at their lower ends they are pivoted at $e'$ to arms D', one each side, which are pivoted at $f'$ to the jaw-bar and at their other ends are pivoted at $g'$ to links E', which at their other ends are pivoted at $f'$ to the other jaw-bar, A. As the two jaw-bars move from or toward each other through the lever and links D' and E' the plate B' will be swung upon its pivot $d'$ accordingly, so that its face will always maintain a parallel line with the face or the holding part $h'$ of the jaw-bar A, so that such parallelism being always maintained the bite of the jaws will be along the length of the plate B' on the bar B and holding-face $h'$ of the other jaw, A, which adapts the vise for work, such as carpenters' work, which generally requires parallel surfaces to hold the work.

Having thus described our invention, what we claim is—

1. In combination, two jaws pivoted together, a toggle-lever connected to said jaws, a treadle-lever pivoted to a suitable support and connected to the toggle-lever, the point of connection on said treadle-lever being at an angle or outside of a straight line between the pivot of the treadle-lever and its operating end.

2. In combination, two jaws pivoted together, a toggle-lever connected to said jaws, a treadle-lever pivoted to a suitable support and connected to the toggle-lever, the point of connection on said treadle-lever being at a point below a straight line between the pivot of the treadle-lever and its operating end.

3. In combination, two jaws pivoted together, a toggle-lever connected to said jaws, a treadle-lever pivoted to one of said jaws and connected to the toggle-lever, a lever pivoted to said lever having an arm or extension arranged to bear against a support and connected to said toggle-lever.

4. In combination, two jaws, a screw-rod secured to one of said jaws and screwing into the other jaw, a toggle-lever connected to said jaws, a treadle-lever pivoted to one of said jaws and connected to the toggle-lever, a lever pivoted to said treadle-lever having an arm or extension arranged to bear against a support, and connected to said toggle-lever.

5. In combination, two jaws pivoted together, a toggle-lever connected to said jaws, a treadle-lever pivoted to one of said jaws and connected to the toggle-lever, a lever pivoted to the treadle-lever having an arm or extension arranged to bear against a support and connected to the toggle-lever, and a spring connected to the two jaws.

6. In combination, two jaws pivoted together, a toggle-lever connected to said jaws, a treadle-lever pivoted to one of said jaws and connected to the toggle-lever, a lever pivoted to the treadle-lever having an arm or extension arranged to bear against a support and connected to said toggle-lever, and a screw in one jaw arranged to bear against the other jaw.

7. In combination, two jaws pivoted together, a toggle-lever connected to said jaws, a treadle-lever pivoted to one of said jaws and connected to the toggle-lever, a lever pivoted to the treadle-lever having an arm or extension arranged to bear against a support and connected to said toggle-lever, a screw in one jaw arranged to bear against the other jaw, and a spring connected to said jaws.

8. In combination, two jaws pivoted together, a toggle-lever connected to said jaws, a treadle-lever pivoted to one of said jaws, a rod pivotally connecting the treadle-lever and the toggle-lever, and a lever pivoted to said treadle-lever having an arm or extension arranged to bear against a support and connected to said toggle-lever.

In testimony whereof we have hereunto set our hands in the presence of two subscribing witnesses.

WILLIAM THOMPSON.
WILLIAM A. THOMPSON.

Witnesses:
WARREN GODDARD,
FRED. P. O'BRIEN.